United States Patent Office 3,116,265
Patented Dec. 31, 1963

3,116,265
PRODUCTION OF THERMOSETTING HYDROCARBON RESINS FROM POLYAROMATIC HYDROCARBON GLYCOL
Chingyun Huang, 249 Okashinmachi, and Minoru Imoto, 181-2 Okashinmachi, both of Maikata-shi, Osaka-Fu, Japan
No Drawing. Filed Nov. 1, 1961, Ser. No. 149,216
Claims priority, application Japan Nov. 9, 1960
2 Claims. (Cl. 260—42)

This invention relates to production of thermosetting hydrocarbon resins, and more particularly it relates to a new method of producing thermosetting, aromatic hydrocarbon resins having highly desirable properties. The present method comprises, in general, the condensation reaction of a polyaromatic hydrocarbon glycol and an aromatic hydrocarbon of trifunctional or higher-functional character in the presence of an acidic catalyst.

It is known in the art that aromatic hydrocarbon reacts with formalin or paraformaldehydes in the presence of a strongly acidic catalyst to produce oxygen-containing, aromatic hydrocarbon-formaldehyde resins. Since, in each of these oxygen-containing, aromatic hydrocarbon-formaldehyde resins, the aromatic hydrocarbon nuclei are coupled by methylene (—CH$_2$—), ether (—CH$_2$OCH$_2$—), and acetal (—CH$_2$OCH$_2$OCH$_2$—) linkages, the said nuclei become new oxygen-containing factors, which could not be found in the novolak of the phenol resins produced heretofore. These oxygen-containing factors undergo condensation reaction with various functional groups, for example, phenol, aniline, phthalic acid and so on. However, the molecular weights of resins produced by the condensation of aromatic hydrocarbons with formalin or paraformaldehydes in the presence of an acidic catalyst are of the order of 300 to 600, which are relatively low. While resins of higher molecular weight are obtainable by increasing the concentration of the acidic catalyst and the reaction temperature, the general result in this case is an increase of the methylene (—CH$_2$—) linkages between the aromatic hydrocarbon nuclei and a decrease in the reactivity in proportion to a decrease in the average oxygen content. Furthermore, an average of one unit or more of aromatic hydrocarbon alkylether end-group (R—CH$_2$OCH$_2$— . . . ), which is composed of only a monofunctional radical, exists in a molecule of an aromatic hydrocarbon formaldehyde resin. In general, aromatic hydrocarbon formaldehyde resins have higher oxygen content and higher reactivity with lower average molecular weight; but, on the other hand, since the content of the aromatic hydrocarbon alkylether residue of monofunctional character is high, these resins have the disadvantage in that the rate of gelation becomes low.

It is an essential object of the present invention to provide a new method for the production of thermosetting, aromatic hydrocarbon resins which do not have such disadvantages as that mentioned above, and which have higher desirable properties.

The manner in which the foregoing as well as other objects and advantages may best be achieved will be understood more fully from a consideration of the following description.

The present invention provides a method which comprises chloromethylating an aromatic hydrocarbon with formalin or paraformaldehyde and hydrochloric acid or hydrogen chloride, separating out an aromatic hydrocarbon containing two chloromethyl radicals from the said chloromethylated product, heating under pressure the same in the presence of an alkali, thus producing polyaromatic hydrocarbon glycol or dimethylol aromatic hydrocarbon, and then heating these intermediate products, with 0.05 to 0.5 percent of an aromatic sulfonic acid, sulfamic acid, or an aromatic hydrocarbon dichloromethylated product, thus producing a polyaromatic hydrocarbon glycol such as shown by the following formula.

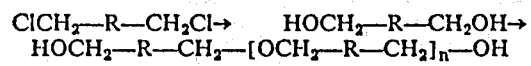

Examples of the aromtic hydrocarbon nuclei R used here are monocyclic to polycyclic compounds such as of benzene, toluene, xylene, mesitylene, durene, naphthalene, methylnaphthalene, acenaphthene, anthracene, and phenanthrene.

Although the aforesaid polyaromatic hydrocarbon glycol is the same as aromatic hydrocarbon formaldehyde resins known heretofore in its starting material composition, it differs essentially from the said resins in its structure, having no inert methylene bond and moreover, containing at both of its extreme ends methylol (—CH$_2$OH) groups which are even more highly active than the ether bond. Moreover, the aforesaid polyaromatic hydrocarbon glycol is cleared at its ether bond by the acidic catalyst during reaction and has the unique feature in that it functions as a theoretically perfect bifunctional radical. Because this polyaromatic hydrocarbon glycol has the substituted aromatic hydrocarbon nucleus, it differs in its properties from a polyaliphatic hydrocarbon glycol and has high reactivity irrespective of the molecular weight. For example, since polyglycol obtained from paradimethylolbenzene, 9,10-dimethylolanthracene, and dimethylodurene has symmetry, it has a high melting point and high molecular weight. On the other hand, since polyglycol obtained from metaxylene and naphthalene is asymmetrical, it has a low melting point.

By the method of the present invention, when a polyaromatic hydrocarbon glycol is mixed and heated, in the presence of 0.2% of an organic acid catalyst such as paratoluene sulfonic acid and paratoluene sulfonic acid chloride, with an aromatic hydrocarbon compound as a hardening agent such as mesitylene, alpha- and beta-methylnaphthalene, acenaphthene, acenaphthylene, anthracene, phenanthrene, an aromatic hydrocarbon having one or two methyl bonds on an aromatic hydrocarbon other than mesitylene, an aldehyde resin of these hydrocarbons, acenaphthylene polymer, or copolymer of acenaphthylene and vinyl aromatic hydrocarbon, a dehydration reaction takes place between the hardening agent and the oxygen-containing element, the dimethylene ether and the methylol group of the extreme end, and the hardening occurs by cross-linking. The derivative having a methyl radical exhibits a higher hardening characteristic than alpha- or beta-methylnaphthalene. Acenaphthylene has a double bond and, when it is heated to 160° C. or higher temperature, it undergoes thermal polymerization, and its hardening is greatly accelerated. Moreover, since these aromatic hydrocarbon formaldehyde resins have molecular weights which are already substantially high, they exhibit high hardening rates in a short time.

This polyaromatic hydrocarbon glycol exhibits a higher hardening rate than an aromatic hydrocarbon formaldehyde resin resulting from reaction of an aromatic hydrocarbon and a formaldehyde by an acidic catalyst and, at the same time, becomes a hardened substance of three-dimensional network which is of fine texture and is insoluble and non-melting. Furthermore, since the three-dimensional, hardened substance obtained in the above-described manner is composed principally of carbon and hydrogen, it is superior to phenol resins, urea resins, melamine resins, and epoxy resins, which are composed of special functional groups, in the matter of weather resistance, resistance against chemicals, moisture resistance, and electrical insulative character. Moreover, by dissolving this resin blended substance in an organic solvent, impregnating paper, fabric, asbestos, etc., with this solution, then heating under pressure the said impregnate material, it is also possible to form laminated products, or, by mixing the said resin blended substance with a filler such as wood flour, pulp, asbestos, and mica, then heating the said mixture under pressure, it is possible to form molded products.

The nature of the invention may be better understood by reference to the following examples, and it must be understood that these examples are presented as illustrative purpose only and that they are not intended to limit the scope of the invention.

Example 1

To 440 parts of polyxyleneglycol (poly-2,6-dimethylolmetaxylene) (melting point: 70 to 75° C., molecular weight: 1,800, and oxygen content: 11.3%), 168 parts of acenaphthene and 9 parts of xylene sulfonic acid are added, and upon heating this mixture at 190° C. for 20 minutes, it hardens, and a hardened substance of yellowish brown color is obtained. When this hardened substance is pulverized to 100-mesh grain size and subjected to 8 hours of benzene extraction in a Soxhlet extrator, an insoluble, non-melting hardened substance of 91.3% content is obtained.

Example 2

440 parts of polyxyleneglycol (poly-2,6-dimethylolmetaxylene) (melting point: 70 to 75° C., molecular weight: 1,800, and oxygen content: 11.3%), 168 parts of acenaphthylene-formaldehyde resin (melting point: 77 to 84° C., molecular weight: 600), 9 parts of paratoluene sulfonic acid, and 400 parts of pulp are mixed and kneaded in a kneader at 100° C. for 20 minutes. Then the mixture is left to cool and subsequently pulverized to produce a molding material.

Example 3

When 100 parts of polyxyleneglycol (poly-2,6-dimethylolmetaxylene) (melting point: 70 to 75° C., molecular weight: 1,800, and oxygen content: 11.3%), 600 parts of acenaphthylene polymer (limiting viscosity: 0.58), and 0.16 part of paratoluene sulfonic acid are mixed and heated at 170° C. for 60 minutes, the mixture thermosets and becomes an insoluble, non-melting hardened substance. When this substance is subjected, similarly as in Example 1, to 8 hours of heat extraction with benzene as a solvent, 85% of insoluble substance is obtained.

Example 4

100 parts of polynaphthaleneglycol (poly-dimethylolnaphthalene) (melting point: 60 to 68° C., molecular weight: 920, and oxygen content: 10.3%), 80 parts of acenaphthylenestyrene copolymer (acenaphthylene content: 60%, limiting viscosity: 0.36), 1.5 parts of xylene sulfonic acid, and 100 parts of pulp are mixed and kneaded at 120° C. for 30 minutes in a kneader. Then the mixture is left to cool and subsequently pulverized to produce a molding material.

Example 5

When 100 parts of polyxyleneglycol (poly-2,6-methylol-metaxylene) (melting point: 62 to 67° C., molecular weight: 760, and oxygen content: 12.0%), 30 parts of acenaphthylene, and 1 part of xylene sulfonic acid are mixed and heated at 180° C. for 20 minutes the mixture sets, and a hardened substance of brown color is obtained. When this substance is pulverized and subjected similarly as in Example 1, to benzene extraction for 8 hours in a Soxhlet extractor, 87.3% of an insoluble, non-melting hardened substance is obtained.

Example 6

When 100 parts of polydurene glycol (poly-3,6-dimethylol-durene) (melting point: 215 to 225° C., molecular weight: 1,200, and oxygen content: 9.4%), 200 parts of acenaphthylene formaldehyde resin (melting point: 75 to 83° C., molecular weight: 780), and 3 parts of paratoluene sulfonic acid are mixed and heated at 180° C. for 30 minutes, the mixture sets and becomes a brown hardened substance. When this substance is pulverized and is subjected to benzene extraction for 8 hours in a Soxhlet extractor, 76.3% of an insoluble, non-melting hardened substance is obtained.

Example 7

When 296 parts of poly-2,6-dimethylolmetaxylene (melting point: 70 to 75° C., molecular weight: 1,800, oxygen content: 11.3%), 178 parts of anthracene, and 9.4 parts of xylene sulfonic acid are mixed and heated at 190° C. for 20 minutes, a brown, hardened substance resin is obtained. When this hardened substance is pulverized then treated similarly as in Example 1, 85% of an insoluble, non-melting resin is obtained.

Example 8

When 296 parts of poly-2,6-dimethylolmetaxylene (melting point: 70 to 75° C., molecular weight: 1,800, oxygen content: 11.3%), 120 parts of mesitylene, and 6.24 parts of paratoluene sulfonic acid are heated in a flask provided with a cooler in a constant-temperature oil bath at 190° C., as reflux action takes place, the reflux of the mesitylene rapidly decreases until in approximately 10 minutes almost no reflux is observable. Heating at the same temperature for an additional 20 minutes produces a thermoset resin. When, after the reaction, this resin is subjected to the same extraction treatment as described in Example 1, 75% of a thermoset, insoluble, non-melting resin is obtained.

Example 9

When 296 parts of poly-2,6-dimethylolmetaxylene (melting point: 68 to 70° C., molecular weight: 1,650, oxygen content: 11.7%), 142 parts of methylnaphthalene, and 8.76 parts of metaxylene sulfonic acid are mixed and heated at 200° C. for 30 minutes, a yellowish brown, thermosetting resin is obtained. When this resin is subjected to the same extraction treatment as described in Example 1, 79% of an insoluble, non-melting resin is obtained.

Example 10

When 300 parts of poly-3,6-dimethyloldurene (melting point: 205 to 225° C., molecular weight: 1,200, oxygen content: 10.1%), 300 parts of alpha-methylnaphthalene formaldehyde resin (molecular weight: 480, oxygen content: 5.6%), and 12 parts of metaxylene sulfonic acid are mixed and heated at 200° C. for 30 minutes, a yellowish brown resin is obtained. When this resin is pulverized and subjected to extraction treatment similarly as in Example 1, 89% of an insoluble, non-melting resin is obtained.

Since it is obvious that many changes and modifications can be made in the above-described details without departing from the nature and spirit of the invention, it

What is claimed is:

1. A process for the production of thermosetting, aromatic hydrocarbon resins, which comprises hardening a poly-aromatic hydrocarbon glycol by heating in the presence of an organic acid catalyst, with at least one aromatic hydrocarbon compound selected from the group consisting of mono-, bi-, and tri-cyclic aromatic hydrocarbons, formaldehyde resins of the said hydrocarbons, and copolymers of the said hydrocarbons with vinyl aromatic hydrocarbon compounds.

2. A process for the production of thermosetting, aromatic hydrocarbon resins, which comprises hardening a poly-aromatic hydrocarbon glycol by heating under pressure in the presence of an organic acid catalyst, with at least one aromatic hydrocarbon compound selected from the group consisting of mono-, bi-, and tri-cyclic aromatic hydrocarbons, formaldehyde resins of the said hydrocarbons, and copolymers of the said hydrocarbons with vinyl aromatic hydrocarbon compounds.

No references cited.